3,183,252
16-NITRATOALKYL-PREGNANES
Pierre Crabbé, Mexico City, Mexico, assignor to Syntex Corporation, Panama, Panama, a corporation of Panama
No Drawing. Filed Sept. 5, 1963, Ser. No. 306,674
22 Claims. (Cl. 260—397.4)

The present invention relates to novel cyclopentanophenanthrene derivatives and to a process for the production thereof.

More particularly the present invention relates to novel 16-nitratomethyl and 16-(1',3'-dinitratoprop-2'-yl)-pregnane derivatives.

The novel compounds of the present invention are represented by the following formulae:

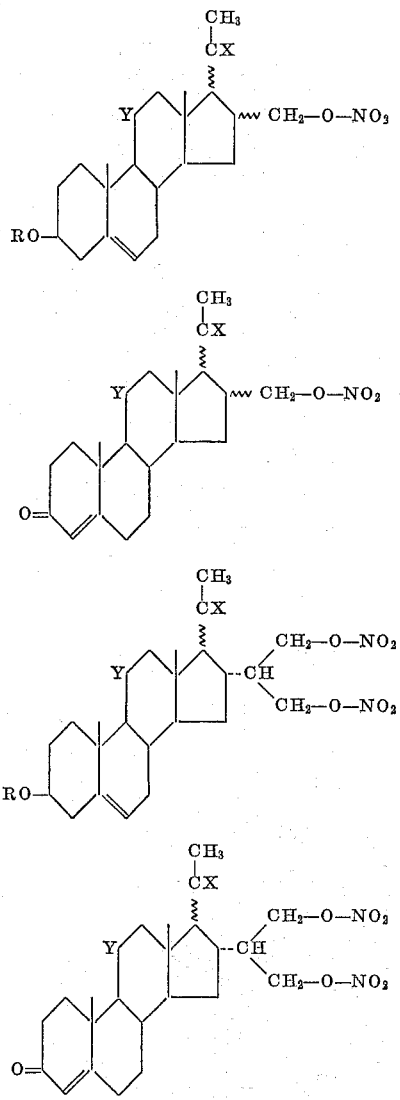

In the above formulae R represents hydrogen or a hydrocarbon carboxylic acyl group of less than 12 carbon atoms; X represents a keto group or a β-nitrato group; Y represents hydrogen, β-hydroxy or a keto group; and ⁑ indicates that the group attached thereby to the steriod nucleus is in the α or β-position.

The acyl group is derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by the above formulae are useful in the treatment of angina pectoris and coronaritis, they possess vasodilatory action on coronary blood vessels and peripherical vasodilatory action. In addition, they are useful as antispasmodic and cardiotropic agents.

The novel compounds of the present invention are prepared by the process exemplified as follows:

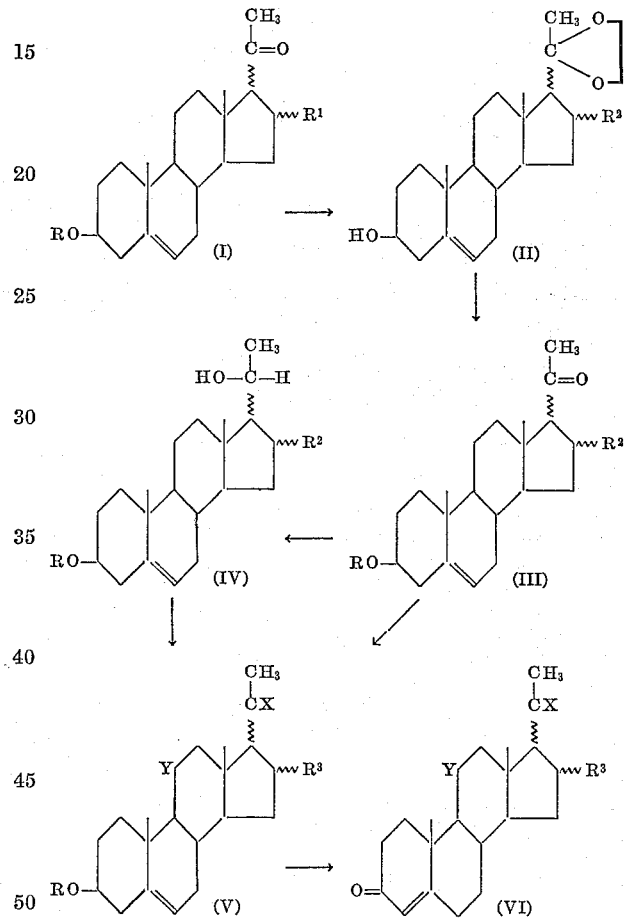

In the above formulae R, X, Y and ⁑ have the same meaning as set forth hereinbefore; $R^1$ represents α or β-carboxy, α or β-carbalkoxy of up to 8 carbon atoms, α-dicarboxymethyl or α-dicarbalkoxymethyl; $R^2$ represents α or β-hydroxymethyl or α-(1,3-dihydroxyprop-2-yl); and $R^3$ represents α or β-nitratomethyl or α-(1,3-dinitratoprop-2-yl).

In practicing the process outlined above, the starting 16-(carboxy or dicarboxymethyl)-Δ⁵-pregnen-3β-ol-20-one derivative (I) is treated conventionally with ethyleneglycol in the presence of p-toluenesulfonic acid to give the corresponding 20-cycloethylenedioxy compound, which upon reduction with a double metal hydride, such as lithium aluminum hydride yields the corresponding 20-cycloethylenedioxy-16-(hydroxymethyl or 1',3'-dihydroxyprop-2'-yl)-Δ⁵-pregnen-3β-ol derivative (II). The latter is treated with triphenylmethyl chloride in the presence of pyridine, preferably at steam bath temperature for approximately 2 hours, then with an anhydride derived from a hydrocarbon carboxylic acid of up to 12 carbon atoms, such as acetic anhydride at approximately 5° C for about 24 hours and finally with a strong acid, such as hydrogen bromide in acetic acid for a period of time of the order of 3 to 5 minutes, thus giving the corresponding 16-(hydroxymethyl or 1′,3′-dihydroxyprop-2′-yl)-$\Delta^5$-pregnen-3$\beta$-ol-20-one-3-acylate derivative (III: R=acyl). The last named compound is treated with a double metal hydride, such as sodium borohydride, preferably under anhydrous conditions, to give the corresponding 16-(hydroxymethyl or 1′,3′-dihydroxyprop-2′-yl)-$\Delta^5$-pregnene-3$\beta$,20$\beta$-diol 3-acylate (IV: R=acyl), which upon treatment with nitric acid, in the presence of acetic acid-acetic anhydride, at approximately from −20° C. to 0° C., for about 20 minutes, yields the corresponding 16-(nitratomethyl or 1′,3′-dinitrato-prop-2′-yl)-$\Delta^5$-pregnene-3$\beta$,20$\beta$-diol 3-acylate-20-nitrate (V: X=$\beta$-nitrato; R=acyl). Reaction of the aforesaid 16-(hydroxymethyl or 1′,3′-dihydroxyprop-2′-yl)-$\Delta^5$-pregnen-3$\beta$-ol-20-one 3-acylate derivative (III: R=acyl) with nitric acid under the conditions just described, affords the corresponding 16-(nitratomethyl or 1′,3′-dinitratoprop-2′-yl)-$\Delta^5$-pregnen-3$\beta$-ol-20-one 3-acylate compound (V: R=acyl; X=keto; Y=H).

The aforesaid 16-nitratomethyl or 1′,3′-dinitratoprop-2′-yl)-$\Delta^5$-pregnen-3$\beta$-ol 3-acylates (V: R=acyl; Y=H) are conventionally saponified to the corresponding 3$\beta$-free alcohols (V: R=Y=H) by treatment with a weak basic solution, for example, dilute water-methanol-potassium hydroxide solution, preferably at 0° C. for about 1 hour. The $\Delta^5$-3$\beta$-alcohols thus obtained (V: R=Y=H) are treated under conventional Oppenauer conditions to give the corresponding $\Delta^4$-3-keto derivatives (VI: Y=H).

The 11-desoxy compounds represented by formulae V and VI (Y=H) are treated with a culture of *Cunninghamella bainieri*, in a medium suitable for its growing and living, for example, water containing 2% of peptone and 5% of corn syrup, with aeration at approximately 28° C. for about 24 hours, thus giving the corresponding 11$\beta$-hydroxy derivatives (V and VI: Y=$\beta$-OH) with concomitant saponification of any existing 3-acyloxy groups. Treatment of the $\Delta^4$-3-keto-11$\beta$-hydroxy compounds (VI: Y=$\beta$-OH) or of the 3$\beta$-acyloxy-11$\beta$-hydroxy-$\Delta^5$-compounds (V: Y=$\beta$-OH; R=acyl; obtained by conventional acylation in pyridine of the 3$\beta$-hydroxy-11$\beta$-hydroxy compounds) with chromium trioxide, e.g. in pyridine, yields the corresponding 11-keto derivatives (VI and V: Y=keto).

The compounds of the present invention having a 3-acyloxy group, are saponified by conventional treatment with a base to produce the corresponding 3-free alcohols which, in turn, may be acylated conventionally in pyridine with an acylating agent to give the corresponding 3-acylates, wherein the acyl group may be different from the previously saponified one.

The following specific examples serve to illustrate the present invention, but are not intended to limit the scope thereof.

PREPARATION 1

1 g. of 16$\alpha$-(dicarbethoxy)methyl-$\Delta^5$-pregnen-3$\beta$-ol-20-one acetate (Mazur et al., Tetrahedron 7, 130 (1959)) was dissolved in 20 cc. of acetic acid and a stream of gaseous hydrogen chloride was passed through the solution, at room temperature for 12 minutes. The resulting mixture was kept at room temperature overnight, under hydrogen chloride atmosphere, then it was diluted with water and extracted with methylene chloride. The organic extract was washed with water to neutral, dried and evaporated to dryness. The residue was recrystallized from acetone-hexane to give 16$\alpha$-(dicarbethoxy)methyl-$\Delta^5$-17$\alpha$-pregnen-3$\beta$-ol-20-one acetate.

Example I

A mixture of 5 g. of 16$\alpha$-carboxy-$\Delta^5$-pregnen-3$\beta$-ol-20-one (obtained according to Heller et al. J. Org. Chem. 27, 2673 (1962)), 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 20-cycloethylenedioxy-16$\alpha$-carboxy-$\Delta^5$-pregnen-3$\beta$-ol-(Cpd. No. 1).

Example II

A solution of 1 g. of Compound No. 1 in 50 cc. of tetrahydrofuran was added over a 30 minute period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 20-cycloethylenedioxy-16$\alpha$-hydroxymethyl-$\Delta^5$-pregnen-3$\beta$-ol (Cpd. No. 2).

Example III

A mixture of 1 g. of Compound No. 2, 3 g. of triphenylmethyl chloride and 15 cc. of pyridine was heated on a steam bath for 2 hours, then it was cooled to 5° C. and 2 cc. of acetic anhydride were added. The resulting mixture was kept at the same temperature for 24 hours, then it was poured slowly into ice-water and the resulting precipitate collected by filtration and dried. The dry solid was mixed thoroughly with 20 cc. of acetic acid and there were added 3 cc. of a saturated solution of hydrogen bromide in acetic acid. The resulting mixture was stirred for 3 minutes, then poured into ice water and the formed precipitate collected by filtration, washed with water, dried and crystallized from acetone-hexane, thus yielding 16$\alpha$-hydroxymethyl-$\Delta^5$-pregnen-3$\beta$-ol-20-one 3-acetate (Cpd. No. 3).

Example IV

16$\alpha$-carbomethoxy-$\Delta^5$-17$\alpha$-pregnen-3$\beta$-ol-20-one (Crabbé et al., Tetrahedron 19, 25 (1963)) was treated successively according to Examples I, II and III, thus yielding respectively:

Cpd. No.—
 4. 20-cycloethylenedioxy-16$\alpha$-carbomethoxy-$\Delta^5$-17$\alpha$-pregnen-3$\beta$-ol,
 5. 20-cycloethylenedioxy-16$\alpha$-hydroxymethyl-$\Delta^5$-17$\alpha$-pregnen-3$\beta$-ol, and
 6. 16$\alpha$-hydroxymethyl-$\Delta^5$-17$\alpha$-pregnen-3$\beta$-ol-20-one 3-acetate.

Example V

16$\beta$-carboxy-$\Delta^5$-pregnen-3$\beta$-ol-20-one (Crabbé et al. v. supra) was treated, consecutively, in accordance with Examples I, II, and III, thus giving respectively:

Cpd. No.—
 7. 20-cycloethylenedioxy-16$\beta$-carboxy-$\Delta^5$-pregnen-3$\beta$-ol,
 8. 20-cycloethylenedioxy-16$\beta$-hydroxymethyl-$\Delta^5$-pregnen-3$\beta$-ol, and
 9. 16$\beta$-hydroxymethyl-$\Delta^5$-pregnen-3$\beta$-ol-20-one 3-acetate.

Example VI

16$\alpha$-carboxy-$\Delta^5$-17$\alpha$-pregnen-3$\beta$-ol-20-one acetate (Crabbé et al., v. supra) was treated successively according to Examples I, II and III, thus giving correspondingly:

Cpd. No.—
 10. 20-cycloethylenedioxy-16$\beta$-carboxy-$\Delta^5$-17$\alpha$-pregnen-3$\beta$-ol,
 11. 20-cycloethylenedioxy-16$\beta$-hydroxymethyl-$\Delta^5$-17$\alpha$-pregnen-3$\beta$-ol,
 12. 16$\beta$-hydroxymethyl-$\Delta^5$-17$\alpha$-pregnen-3$\beta$-ol-20-one 3-acetate.

Example VII

16α-(dicarbethoxy)methyl - Δ$^5$ - pregnen-3β-ol-20-one acetate (Mazur et al., Tetrahedron 7, 130, (1959)) was treated consecutively by the procedures described in Examples I, II and III, thus yielding respectively:

Cpd. No.—
13. 20-cycloethylenedioxy-16α-(dicarbethoxy)methyl-Δ$^5$-pregnen-3β-ol,
14. 20-cycloethylenedioxy-16α-(1',3'dihydroxyprop-2'-yl)-Δ$^5$-pregnen-3β-ol,
15. 16α-(1',3'-dihydroxyprop-2'-yl)-Δ$^5$-pregnen-3β-ol-20-one 3-acetate.

Example VIII

16β-(dicarbethoxy)methyl - Δ$^5$ - 17α-pregnen-3β-ol-20-one acetate was treated consecutively according to Examples I, II, and III, thus furnishing respectively:

Cpd. No.—
16. 20-cycloethylenedioxy-16α-(dicarbethoxy)methyl-Δ$^5$-17α-pregnen-3β-ol,
17. 20-cycloethylenedioxy-16α-(1',3'-dihydroxyprop-2'-yl)-Δ$^5$-17α-pregnen-3β-ol,
18. 16α-(1',3'-dihydroxyprop-2'yl)-Δ$^5$-17α-pregnen-3β-ol-20-one 3-acetate.

Example IX

A solution of 2 g. of sodium borohydride in 30 cc. of methanol was added with stirring to a solution of 2 g. of Compound No. 3 in 40 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetonehexane gave 16α-hydroxymethyl-Δ$^5$-pregnene-3β,20β-diol 3-acetate (Cpd. No. 19).

The Compounds Nos. 6, 9, 12, 15 and 18 were treated by the above procedure, thus giving respectively:

Cpd. No.—
20. 16α-hydroxymethyl-Δ$^5$-17α-pregnene-3β,20β-diol-3-acetate,
21. 16β-hydroxymethyl-Δ$^5$-pregnene-3β,20β-diol 3-acetate,
22. 16β-hydroxymethyl-Δ$^5$-17α-pregnene-3β,20β-diol 3-acetate,
23. 16α-(1'3'-dihydroxyprop-2'-yl)-Δ$^5$-pregnene-3β,20β-diol-3-acetate,
24. 16α-(1',3'-dihydroxyprop-2'-yl)-Δ$^5$-17α-pregnene-3β,20β-diol 3-acetate.

Example X

A mixture of 1 g. of Compound No. 3, 5 cc. of acetic anhydride and 5 cc. of acetic acid was cooled to −10° C., then there was added cautiously 1 cc. of fuming nitric acid. The resulting mixture was stirred at −20° C. for 15 minutes and at 0° C. for 5 minutes, thereafter it was poured into water and extracted with ethyl acetate. The organic extract was dried, and evaporated to dryness. Crystallization of the residue from acetone-hexane yielded 16α-nitratomethyl-Δ$^5$-pregnen-3β-ol-20-one 3-acetate (Cpd. No. 25).

The compounds Nos. 6, 9, 12, 15, 18, 19, 20, 21, 22, 23 and 24 were treated following the latter procedure, thus furnishing respectively:

Cpd. No.—
26. 16α-nitratomethyl-Δ$^5$-17α-pregnen-3β-ol-20-one 3-acetate,
27. 16β-nitratomethyl-Δ$^5$-pregnen-3β-ol-20-one 3-acetate,
28. 16β-nitratomethyl-Δ$^5$-17α-pregnen-3β-ol-20-one 3-acetate,
29. 16α-(1',3'-dinitratoprop-2'-yl)-Δ$^5$-pregnen-3β-ol-20-one 3-acetate, Cpd. No.—
30. 16α-(1',3'-dinitratoprop-2'-yl)-Δ$^5$-17α-pregnen-3β-ol-20-one 3-acetate,
31. 16α-nitratomethyl-Δ$^5$-pregnene-3β,20β-diol 3-acetate 20-nitrate,
32. 16α-nitratomethyl-Δ$^5$-17α-pregnene-3β,20β-diol-3-acetate-20-nitrate,
33. 16β-nitratomethyl-Δ$^5$-pregnene-3β,20β-diol 3-acetate 20-nitrate,
34. 16β-nitratomethyl-Δ$^5$-17α-pregnene-3β,20β-diol 3-acetate 20-nitrate,
35. 16α-(1',3'-dinitratoprop-2'-yl)-Δ$^5$-pregnene-3β,20β-diol-3-acetate 20-nitrate,
36. 16α-(1',3'-dinitratoprop-2'-yl-Δ$^5$-17α-pregnene-3β,20β-diol 3-acetate 20-nitrate.

Example XI 2 g. of Compound No. 25 were dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 16α-nitratomethyl-Δ$^5$-pregnen-3β-ol-20-one (Cpd. No. 37).

The compounds Nos. 26 to 36, inclusive, were treated according to Example X, thus yielding respectively:

Cpd. No.—
38. 16α-nitratomethyl-Δ$^5$-17α-pregnen-3β-ol-20-one,
39. 16β-nitratomethyl-Δ$^5$-pregnen-3β-ol-20-one,
40. 16β-nitratomethyl-Δ$^5$-17α-pregnen-3β-ol-20-one,
41. 16α-(1',3'-dinitratoprop-2'-yl)-Δ$^5$-pregnen-3β-ol-20-one,
42. 16α-(1',3'-dinitratoprop-2'-yl)-Δ$^5$-17α-pregnen-3β-ol-20-one,
43. 16α-nitratomethyl-Δ$^5$-pregnene-3β,20β-diol-20-nitrate,
44. 16α-nitratomethyl-Δ$^5$-17α-pregnene-3β,20β-diol-20-nitrate,
45. 16β-nitratomethyl-Δ$^5$-pregnene-3β,20β-diol 20-nitrate,
46. 16β-nitratomethyl-Δ$^5$-17α-pregnene-3β,20β-diol 20-nitrate,
47. 16α-(1'3'-dinitratoprop-2'-yl)-Δ$^5$-pregnene-3β,20β-diol-20-nitrate,
48. 16α-(1',3'-dinitratoprop-2'-yl)-Δ$^5$-17α-pregnene-3β,20β-diol 20-nitrate.

Example VII

A mixture of 1 g. of Compound No. 37, 4 cc. of pyridine and 2 cc. of caproic anhydride was kept at room temperature overnight, poured into ice water, the formed precipitate was filtered, washed with water and dried. Crystallization from acetone-hexane gave 16α-nitratomethyl-Δ$^5$-pregnen-3β-ol-20-one 3-caproate (Cpd. No. 49).

The Compounds Nos. 38 to 48, inclusive, were treated following the above procedure, thus yielding the corresponding 3-caproates.

Example XIII

The starting compounds of Example XII were treated following exactly the procedure described in that example, except that caproic anhydride was substituted by propionic anhydride, enanthic anhydride and cyclopentylpropionic anhydride, thus affording respectively the corresponding propionates, enanthates, and cyclopentylpropionates of said starting compounds.

Example XIV

A solution of 1 g. of Compound No. 37 in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 45 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded 16α-nitratomethyl-Δ⁴-pregnene-3,20-dione (Cpd. No. 50).

The Compounds Nos. 38 to 48, inclusive, were treated by the above procedure, thus furnishing respectively:

Cpd. No.—
51. 16α-nitratomethyl-$\Delta^4$-17α-pregnene-3,20-dione,
52. 16β-nitratomethyl-$\Delta^4$-pregnene-3,20-dione,
53. 16β-nitratomethyl-$\Delta^4$-17α-pregnene-3,20-dione,
54. 16α-(1',3'-dinitratoprop-2'-yl)-$\Delta^4$-pregnene-3,20-dione,
55. 16α-(1',3'-dinitratoprop-2'-yl)-$\Delta^4$-17α-pregnene-3,20-dione,
56. 16α-nitratomethyl-$\Delta^4$-pregnen-20β-ol-3-one 20-nitrate,
57. 16α-nitratomethyl-$\Delta^4$-17α-pregnen-20β-ol-3-one 20-nitrate,
58. 16β-nitratomethyl-$\Delta^4$-pregnen-20β-ol-3-one 20-nitrate,
59. 16β-nitratomethyl-$\Delta^4$-17α-pregnen-20β-ol-3-one 20-nitrate,
60. 16α-(1',3'-dinitratoprop-2'-yl)-$\Delta^4$-pregnen-20β-ol-3-one 20-nitrate,
61. 16α-(1',3'-dinitratoprop-2'-yl)-$\Delta^4$-17α-pregnen-20β-ol-3-one 20-nitrate.

*Example XV*

A culture of *Cunninghamella bainieri* ATCC 9244 was prepared by inoculating an aqueous medium which contained 2% of peptone and 5% of corn syrup with a vegetating growth of the above culture in the same medium and stirring at 28° C. with aeration for 24 hours.

To 340 cc. of this culture there were then added 10 cc. of 1% ethanolic solution of Compound No. 37, the mixture was stirred with aeration at 28° C. for 24 hours. The product of this incubation was extracted several times with methylene-chloride, the extract was washed with water, dried over sodium sulfate, filtered and concentrated to small volume under reduced pressure.

The concentrated extracts were adsorbed on a column prepared with 20 g. of silica gel and 20 g. of celite, washed previously with methylene chloride. Elution and crystallization gave 16α-nitratomethyl-$\Delta^5$-pregnene-3β,11β-diol-20-one (Cpd. No. 62).

The Compounds Nos. 38 to 48, inclusive, and 50 to 61, inclusive, were treated by the above procedure, thus yielding respectively:

Cpd. No.—
63. 16α-nitratomethyl-$\Delta^5$-17α-pregnene-3β,11β-diol-20-one,
64. 16β-nitratomethyl-$\Delta^5$-pregnene-3β,11β-diol-20-one,
65. 16β-nitratomethyl-$\Delta^5$-17α-pregnene-3β,11β-diol-20-one,
66. 16α-(1',3'-dinitratoprop-2'-yl)-$\Delta^5$-pregnene-3β,11β-diol-20-one,
67. 16α-(1',3'-dinitratoprop-2'-yl)-$\Delta^5$-17α-pregnene-3β,11β-diol-20-one,
68. 16α-nitratomethyl-$\Delta^5$-pregnene-3β,11β,20β-triol 20-nitrate
69. 16α-nitratomethyl-$\Delta^5$-17α-pregnene-3β,11β,20β-triol 20-nitrate,
70. 16β-nitratomethyl-$\Delta^5$-pregnene-3β,11β,20β-triol 20-nitrate,
71. 16β-nitratomethyl-$\Delta^5$-17α-pregnene-3β,11β,20β-triol 20-nitrate,
72. 16α-(1',3'-dinitratoprop-2'-yl)-$\Delta^5$-pregnene-3β,11β,20β-triol 20-nitrate,
73. 16α-(1',3'-dinitratoprop-2'-yl)-$\Delta^5$-17α-pregnene-3β,11β,20β-triol 20-nitrate,
74. 16α-nitratomethyl-$\Delta^4$-pregnen-11β-ol-3,20-dione,
75. 16α-nitratomethyl-$\Delta^4$-17α-pregnen-11β-ol-3,20-dione,
76. 16β-nitratomethyl-$\Delta^4$-pregnen-11β-ol-3,20-dione,
77. 16β-nitratomethyl-$\Delta^4$-17α-pregnen-11β-ol-3,20-dione,
78. 16α-(1',3'-dinitratoprop-2'-yl)-$\Delta^4$-pregnen-11β-ol-3,20-dione,
79. 16α-(1',3'-dinitratoprop-2'-yl)-$\Delta^4$-17α-pregnen-11β-ol-3,20-dione,
80. 16α-nitratomethyl-$\Delta^4$-pregnene-11β,20β-diol-3-one 20 nitrate,
81. 16α-nitratomethyl-$\Delta^4$-17α-pregnene-11β,20β-diol-3-one 20-nitrate,
82. 16β-nitratomethyl-$\Delta^4$-pregnene-11β,20β-diol-3-one 20-nitrate,
83. 16β-nitratomethyl-$\Delta^4$-17α-pregnene-11β,20β-diol-3-one 20-nitrate,
84. 16α-(1',3'-dinitratoprop-2'-yl)-$\Delta^4$-pregnene-11β,20β-diol-3-one 20-nitrate,
85. 16α-(1',3'-dinitratoprop-2'-yl)-$\Delta^4$-17α-pregnene-11β,20β-diol-3-one 20-nitrate,

*Example XVI*

A solution of 6 g. of Compound No. 74 in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded (16α-nitratomethyl)-$\Delta^4$-pregnene-3,11,20-trione (Cpd. No. 86).

The Compounds Nos. 75 to 85, inclusive, were treated by the same procedure thus yielding respectively:

Cpd. No.—
87. 16α-nitratomethyl-$\Delta^4$-17α-pregnene-3,11,20-trione,
88. 16β-nitratomethyl-$\Delta^4$-pregnene-3,11,20-trione,
89. 16β-nitratomethyl-$\Delta^4$-17α-pregnene-3,11,20,-trione,
90. 16α-(1',3'-dinitratoprop-2'-yl)-$\Delta^4$-pregnene-3,11,20-trione,
91. 16α-(1',3'-dinitratoprop-2'-yl)-$\Delta^4$-17α-pregnene-3,11,20-trione,
92. 16α-nitratomethyl-$\Delta^4$-pregnen-20β-ol-3,11-dione 20-nitrate,
93. 16α-nitratomethyl-$\Delta^4$-17α-pregnen-20β-ol-3,11-dione 20-nitrate,
94. 16β-nitratomethyl-$\Delta^4$-pregnen-20β-ol-3,11-dione 20-nitrate,
95. 16β-nitratomethyl-$\Delta^4$-17α-pregnen-20β-ol-3,11-dione 20-nitrate,
96. 16α-(1',3'-dinitratoprop-2'-yl)-$\Delta^4$-pregnen-20β-ol-3,11-dione 20-nitrate,
97. 16α-(1',3'-dinitratoprop-2'-yl)-$\Delta^4$-17α-pregnen-20β-ol-3,11-dione 20-nitrate.

*Example XVII*

The Compound No. 62 was treated successively according to Examples XII and XVI, thus yielding respectively: 16α-nitratomethyl-$\Delta^5$-pregnene-3β,11β-diol-20-one 3-caproate (Cpd. No. 98) and 16α-nitratomethyl-$\Delta^5$-pregnen-3β-ol-11,20-dione 3-caproate (Cpd. No. 99).

Upon treatment of Compound No. 66 by the above procedures, there were respectively produced: 16α-(1',3'-dinitratoprop-2'-yl)-$\Delta^5$-pregnene-3β,11β-diol-20-one 3-caproate (Cpd. No. 100) and 16α-(1',3'-dinitratoprop- 2'-yl)-Δ⁵-pregnen-3β-ol-11,20-dione 3-caproate (Cpd. No. 101).

I claim:
1. A compound of the following formula:

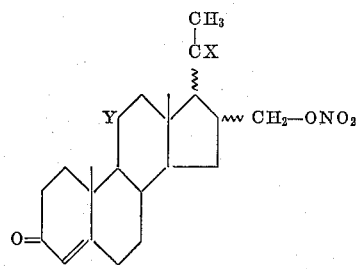

wherein X is selected from the group consisting of β-nitrato and a keto group; and Y is selected from the group consisting of hydrogen, β-hydroxyl and keto.

2. A compound of the following formula:

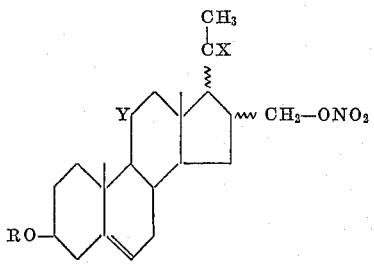

wherein X is selected from the group consisting of β-nitrato and a keto group; R is a member of the group consisting of hydrogen and hydrocarbon carboxylic acyl group of less than 12 carbon atoms; and Y is selected from the group consisting of hydrogen, β-hydroxyl and keto.

3. A compound of the following formula:

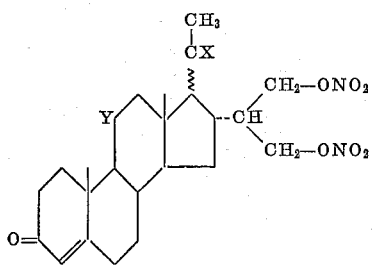

wherein X is selected from the group consisting of β-nitrato and a keto group, and Y is selected from the group consisting of hydrogen, β-hydroxyl and keto.

4. A compound of the following formula:

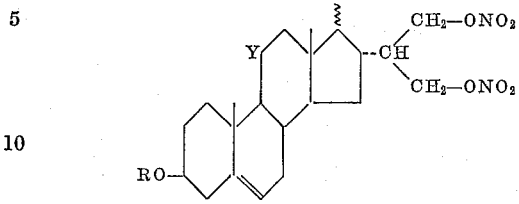

wherein X is selected from the group consisting of β-nitrato and a keto group; R is a member of the group consisting of hydrogen and a hydrocarbon carboxylic acyl group of less than 12 carbon atoms; and Y is selected from the group consisting of hydrogen, β-hydroxyl and keto.

5. 16α-nitratomethyl-Δ⁵-pregnen-3β-ol-20-one.
6. 16α-nitratomethyl-Δ⁵-17α-pregnen-3β-ol-20-one.
7. 16β-nitratomethyl-Δ⁵-pregnene-3β-ol-20-one.
8. 16β-nitratomethyl-Δ⁵-17α-pregnen-3β-ol-20-one.
9. 16α - (1',3' - dinitratoprop - 2' - yl)-Δ⁵-pregnen-3β-ol-20-one.
10. 16α - (1',3' - dinitratoprop - 2'-yl)-17α-pregnen-3β-ol-20-one.
11. 16α-nitratomethyl-Δ⁴-pregnene-3,20-dione.
12. 16α-nitratomethyl-Δ⁴-17α-pregnene-3,20-dione.
13. 16β-nitratomethyl-Δ⁴-pregnene-3,20-dione.
14. 16β-nitratomethyl-Δ⁴-17α-pregnene-3,20-dione.
15. 16α-(1',3'-dinitratoprop-2'-yl)-Δ⁴-pregnene-3,20-dione.
16. 16α - (1',3'-dinitratoprop-2'-yl)-17α-pregnene-3,20-dione.
17. 16α - nitratomethyl - Δ⁴ - pregnen - 20β-ol-3-one-20-nitrate.
18. 16α - nitratomethyl - Δ⁴-17α-pregnen-20β-ol-3-one-20-nitrate.
19. 16β - nitratomethyl - Δ⁴ - pregnen-20β-ol-3-one-20-nitrate.
20. 16β - nitratomethyl - Δ⁴ - 17α - pregnen - 20β-ol-3-one-20-nitrate.
21. 16α - (1',3' - dinitratoprop - 2' - yl) - Δ⁴ - pregnen-20β-ol-3-one-20-nitrate.
22. 16α - (1',3' - dinitratoprop - 2' - yl) - 17α-pregnen-20β-ol-3-one-20-nitrate.

References Cited by the Examiner
UNITED STATES PATENTS
2,913,466  11/56  Dodson _____ 260—397.3
2,999,103   9/61  Rausser et al. _____ 260—397.45

LEWIS GOTTS, *Primary Examiner.*